United States Patent Office 3,496,991
Patented Feb. 24, 1970

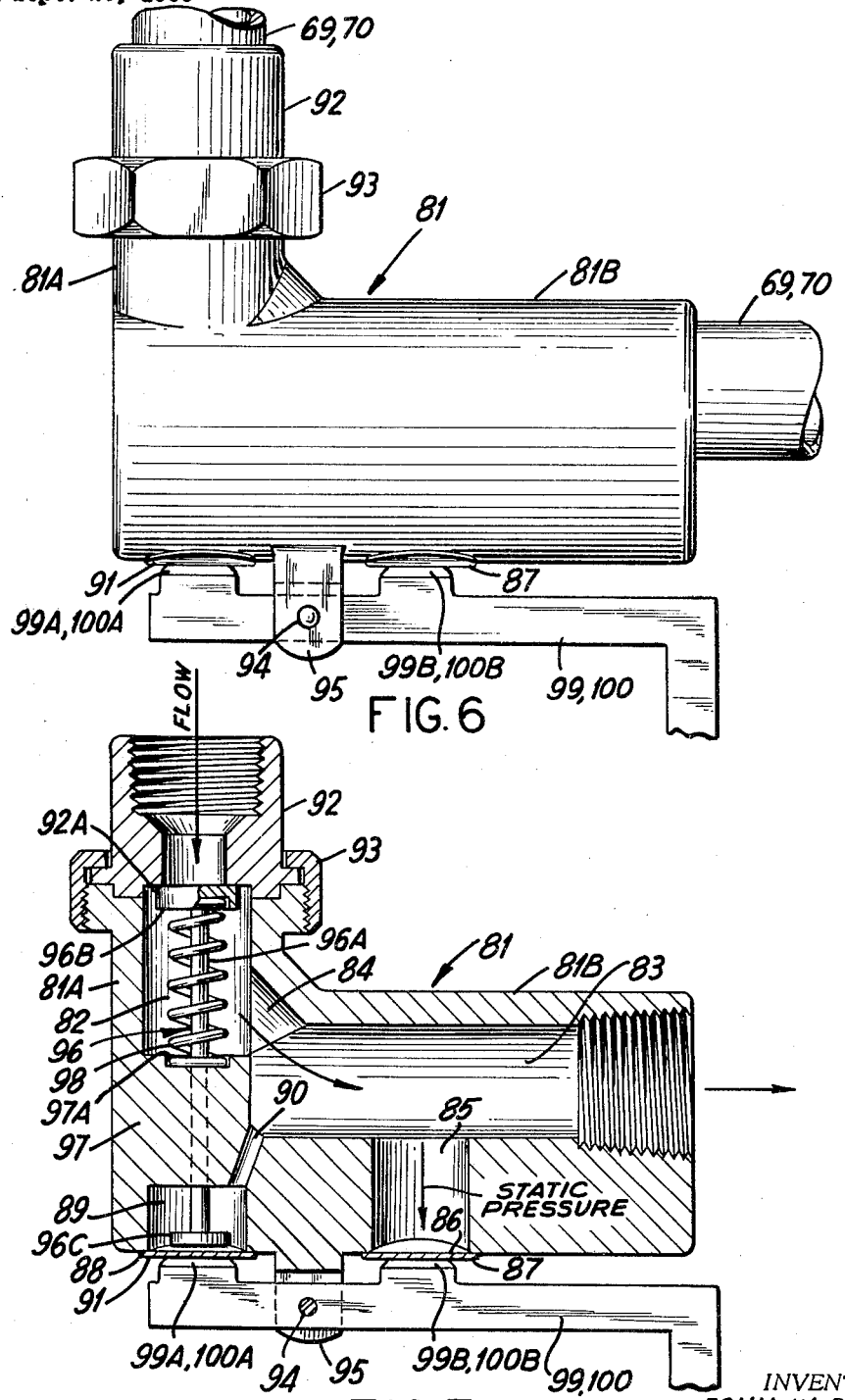

3,496,991
FLUID TEMPERATURE REGULATING METHOD AND APPARATUS
John W. Barnd, 32 Hollybrook Road,
Paramus, N.J. 07652
Filed Sept. 20, 1966, Ser. No. 580,732
Int. Cl. F25b 13/00; G05d 23/12
U.S. Cl. 165—2                                             38 Claims

ABSTRACT OF THE DISCLOSURE

A self-modulating system for producing fluid at a desired temperature in accordance with demand where fluid is thermally processed and then thermostatically mixed with unprocessed fluid in proper proportions, the thermal process output being an instantaneous function of demand for both unprocessed fluid and processed fluid, the result being a modulation of the rate of thermal process output per unit of fluid being thermally processed in accordance with existing temperature conditions and requirements.

---

The present invention relates generally to automatic fluid temperature regulating systems, and more particuluarly, to fluid temperature regulating methods and apparatus of the type having a fluid quench line.

Fluid temperature regulating systems of many types are used in producing temperature regulated water for domestic and commercial use and as part of heating and/or cooling systems. Additionally, such systems are used industrially in the processing of fluid products such as milk, petroleum, etc.

For example, the water temperature regulating systems in domestic use today are, generally speaking, either of the storage type, which employ tanks for the storage of water in a heated state in anticipation of demand, or of the flow-through or instantaneous type which employ a fluid process line for transporting the water through a heater in accordance with demand for heated water.

These instantaneous type systems customarily employ devices for regulating the fuel supply to the heater directly with variations in demand for heated water as determined by the rate of fluid flow through the heater.

Additionally, many of these system include a fluid quench line which by-passes the heater to join the process line at a thermostatic mixing valve which apportions the flow between the two lines, mixes the heated and unheated water, and delivers the mixed water at the desired temperature to the output of the system.

Some instantaneous heaters employ temperature-sensing means in order to regulate the fuel supply directly in accordance with variations in the input temperature of the fluid. Such systems are, however, operable solely at constant flow rates and are therefore quite limited in their usefulness and are not pertinent to the present discussion.

The potential economic advantages of such instantaneous type systems over storage type systems are apparent However, such temperature regulating systems have not received widespread acceptance. These systems have certain inherent limitations which materially affect their overall efficiency and which render them particularly unsuitable for use other than in producing hot water at noncritical temperatures, or as booster heaters for dishwashing machines and other similar applications.

Basically, none of the systems in the present practice are capable of automatically re-adjusting the heater output relative to the fluid flow through the process line in response to changes in existing temperature conditions or requirements. Once the maximum thermal output of the heater in any of the prior art systems is set by adjustment of the fuel modulating device in accordance with the extremes in temperature conditions and requirements in a given application, the heater outputs of such systems at any given time are fixed to and dependent solely upon the rate of fluid flow through the process line.

Because such present systems are incapable of automatically re-adjusting the heater output in response to changes in existing temperature conditions and requirements, the temperature of the fluid leaving the heater will fluctuate with fluctuations in the temperature of the liquid entering the system regardless of the desired fluid output temperature. Moreover, changes in the desired fluid output temperature as represented by a re-setting of the thermostatic mixing valve in such systems will not result in corresponding changes in the temperature of the fluid leaving the heater.

Stated another way, the temperature rise imparted to the fluid passing through the process line in any of the present practice systems will remain unchanged even though the difference between the input temperature and the desired output temperature should vary.

Consequently, fuel consumption of the systems currently being used is often inordinately high in relation to the amount of heating which should be necessary to provide fluid at the desired temperature.

A further consequence is that the ranges of temperatures over which presently existing systems are operable without the need for factory adjustments of the apparatus is quite limited. A still further and important consequence of the prior art system limitations is that they are unsuitable for use in situations where close temperature control is a must as in industrial processes where the fluid product to be processed is quite often volatile in nature and wherein its temperature must be closely controlled at all points of the system, especially at the output of the heater and not just at the output of the system.

It is, therefore, a general object of this invention to provide automatic and accurate fluid temperature regulating methods and apparatus capable of supplying widely varying volumes of fluid over a relatively wide range of pre-determined output temperatures with a minimum of fuel consumption.

It is a further and more particular object of this invention to provide fluid temperature regulating methods and apparatus capable of providing automatic and in instantaneous thermal process modulation in response to fluid input temperature fluctuations and variations in desired output temperatures.

It is a still further object of this invention to provide automatic fluid temperature regulating methods and apparatus of the type characterized which can be used to supply water at varying pre-determined temperatures for a variety of domestic and commercial uses and which can also be used industrially such as in the processing of volatile fluid products.

It is another object of this invention to provide an automatic fluid temperature regulaitng system which is simple in construction, easy and economical to install, and which requires a minimum of maintenance after installation.

These and other objects, features and advantages are accomplished, according to the invention, by the methods, arrangements and combinations of elements hereinafter fully described and particularly recited in the claims, and will become more apparent therefrom.

Briefly and generally, the method in accordance with the present invention comprises transporting the fluid that is to be temperature regulated from an input point to an output point via two parallel paths in accordance with demand for the temperature regulated fluid, mixing the fluids from said paths prior to said output point, thermal processing the fluid flowing along one of said paths, modulating the thermal process output per unit of fluid being processed in accordance with variations in the relationship between demand for unprocessed fluid and total fluid demand and apportioning the total fluid flow between the two paths to obtain fluid at the desired temperature. When demand for unprocessed fluid is one-half total fluid demand, the thermal process output is zero and, when there is no demand for unprocessed fluid, the thermal process output per unit of fluid being processed is a maximum.

The range of the fluid input temperatures may, in certain applications, always be lower than the range of desired output temperatures whereupon the thermal process would be limited to heating the fluid flowing along one of the paths. On the other hand, there may be applications where the fluid input temperatures will always be greater than the range of desired output temperatures so that the thermal process would be limited to cooling the fluid flowing along one of the paths.

There may, however, be situations where the fluid input temperature could either be lower or higher than the desired output temperature. When such is the case, the fluid flowing along one path may be heated if the input temperature drops below the desired output temperature for the fluid, or the fluid flowing along the other path may be cooled if the input temperature should exceed the desired output temperature. The demand for unprocessed fluid employed as a determining criterion for modulation of the thermal output per unit of fluid being processed would be the amount of fluid at the input temperature required for mixing to obtain fluid at the desired temperature. Where heating and cooling may be alternately required, equal distribution of flow between the two paths will indicate that the input temperature is equal to the desired output temperature and in such an instance the heating output and the cooling output will both be zero.

Briefly and generally, apparatus for carrying out the invention comprises a fluid flow system including a pair of parallel pipelines providing fluid flow communication between a fluid supply source and thermostatic mixing means, said mixing means being adapted to produce fluid at a predetermined temperature in accordance with demand by apportioning the total fluid flow between the two lines and mixing the fluids from the lines to obtain fluid at the predetermined temperature, suitable thermal process means for causing the temperature of the fluid flowing through one of said lines to approach the predetermined temperature, flow sensing means positioned for determining demand for both processed fluid and unprocessed fluid and modulation means operatively connecting said flow sensing means and said thermal process means, said modulation means being adapted to control the thermal process output in accordance with both demand for process fluid and demand for unprocessed fluid.

The flowing sensing means can be of the inferential type which employs a pair of static pressure lines, one taken off each of the fluid flow lines, for transmitting the static pressures corresponding to the rates of flow in the fluid lines to the modulating means.

The flow sensing means can also of the type which determines variations in the dynamic pressures in the fluid lines directly. In such an embodiment, a flow sensing device adapted for determining velocity head or dynamic pressure is inserted in each of the fluid lines. Suitable mechanical linkages are operatively connected to the flow sensing devices and to the thermal process means for modulation of the latter so that increases in flow in the process line results in positive movement of the linkages increasing the thermal output whereas increases in flow in the quench line results in negative movement of the linkages.

More preferably, the flow sensing device comprises a housing in the shape of an elbow with fluid entering and leaving in generally orthogonal directions. Two pressure ports are formed in the housing wall; a dynamic pressure port coaxially aligned with the inlet passageway; and a static pressure port in static pressure communication with the departing fluid. Each of the ports has a flexible leak-proof diaphragm cover which is secured to the outside of the housing. Disposed lengthwise in the path of the incoming fluid is an actuator operable to flex the diaphragm of the first mentioned port outwardly with increases in the rate of flow of the incoming stream. Pivotally secured to the exterior of the housing between the two ports is a balance arm which lightly contacts the outer surfaces of the diaphragm covers under no flow conditions. Upon the occurrence of flow or changes in the flow rate through the sensing device, pivotal movement of the balance arm results which, in turn, through other suitable linkages, modulates the thermal process output.

Having briefly described the invention, a more detailed description is now made by reference to the accompanying drawings which form part of the specification, wherein:

FIGURE 6 is an elevational view of a flow sensing device for use in the system of FIGURE 5;

FIGURE 7 is a central vertical sectional view of the device of FIGURE 6; and

Figure 1:
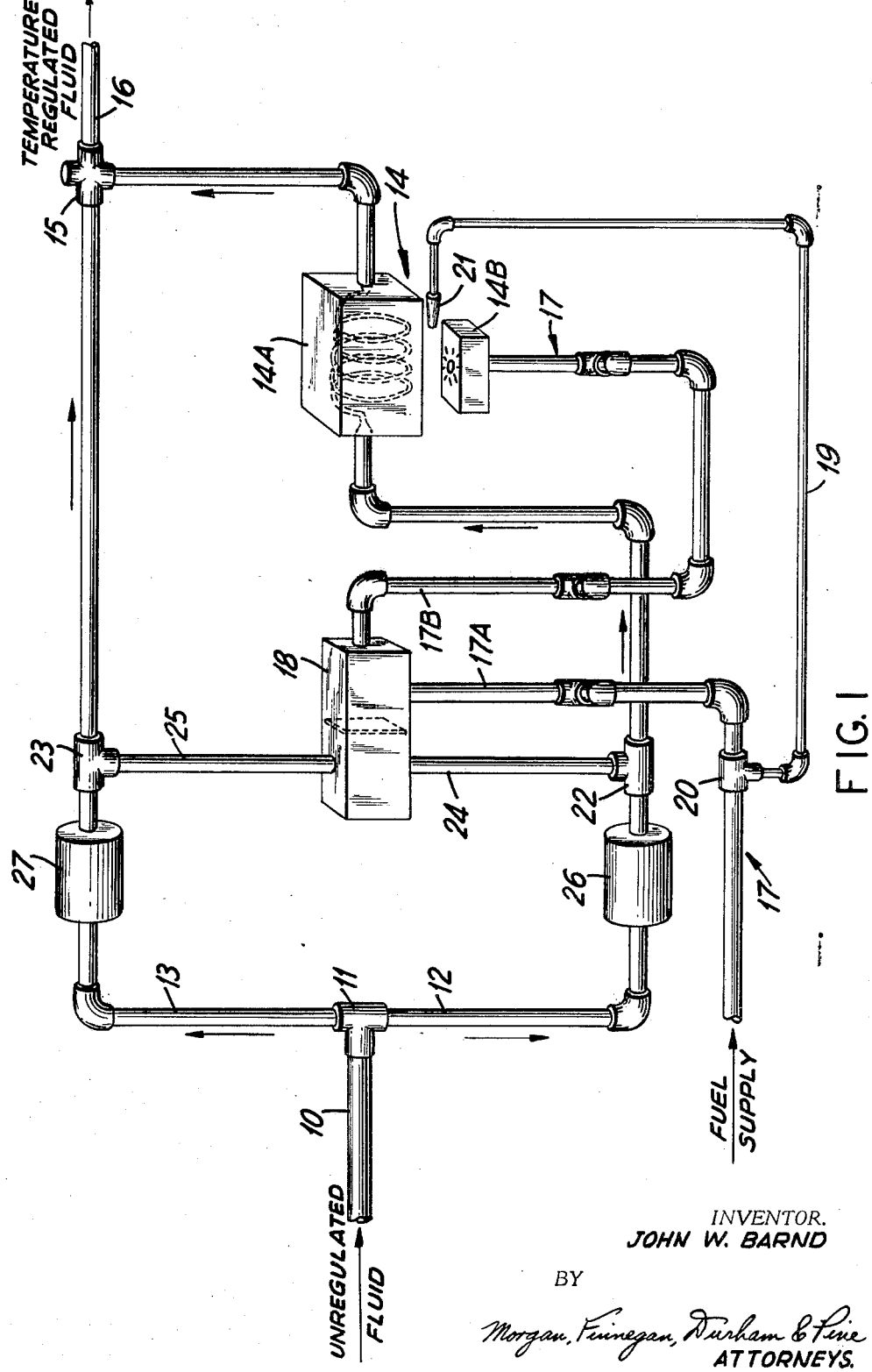
FIGURE 1 is a schematic illustration, partially diagrammatical and partially in perspective, of a fluid flow and temperature regulating system for carrying out the present invention.
Figure 2:
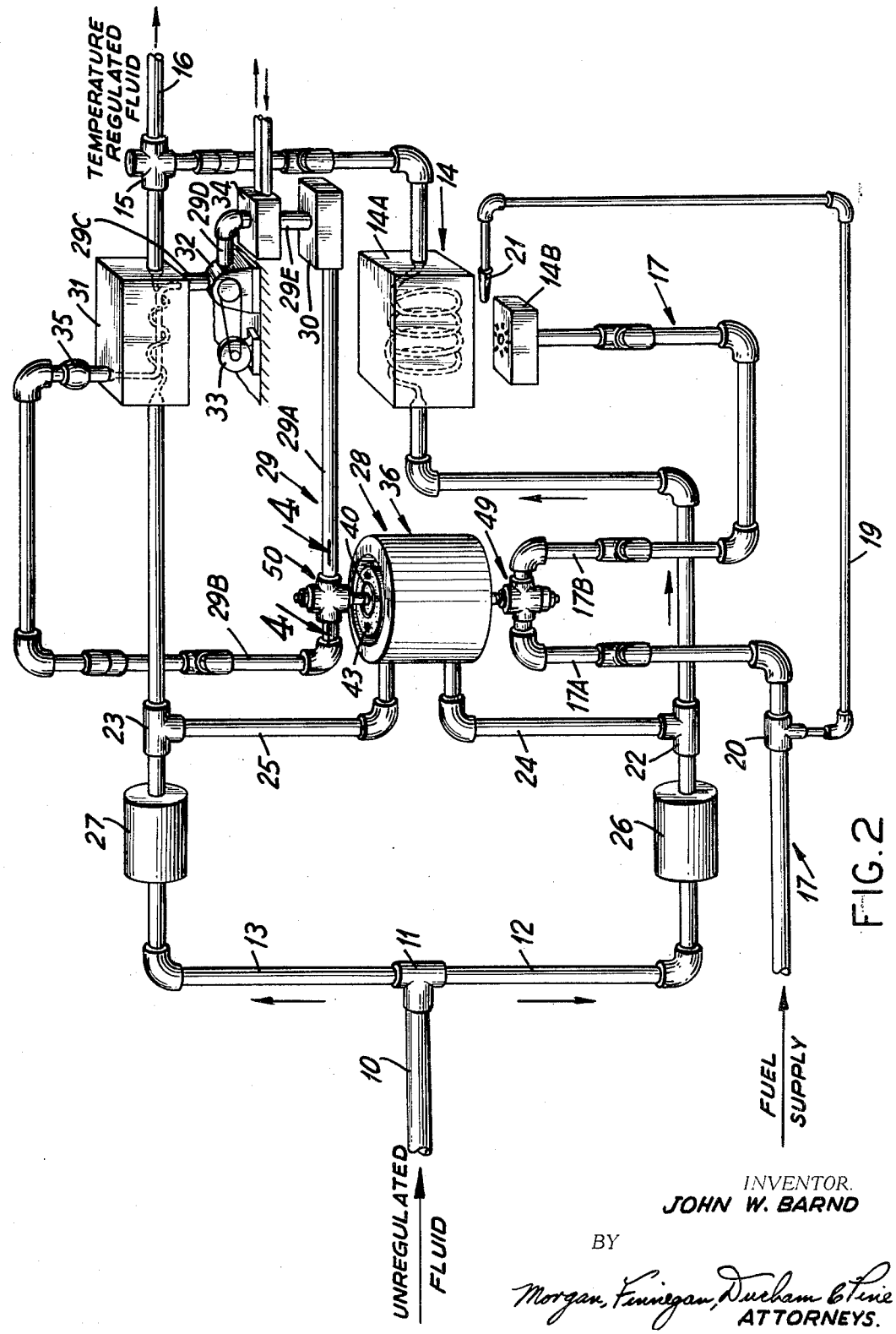
FIGURE 2 is a schematic illustration, partially diagrammatical and partially in perspective, of a modified form of the system of FIGURE 1.
Figure 5:
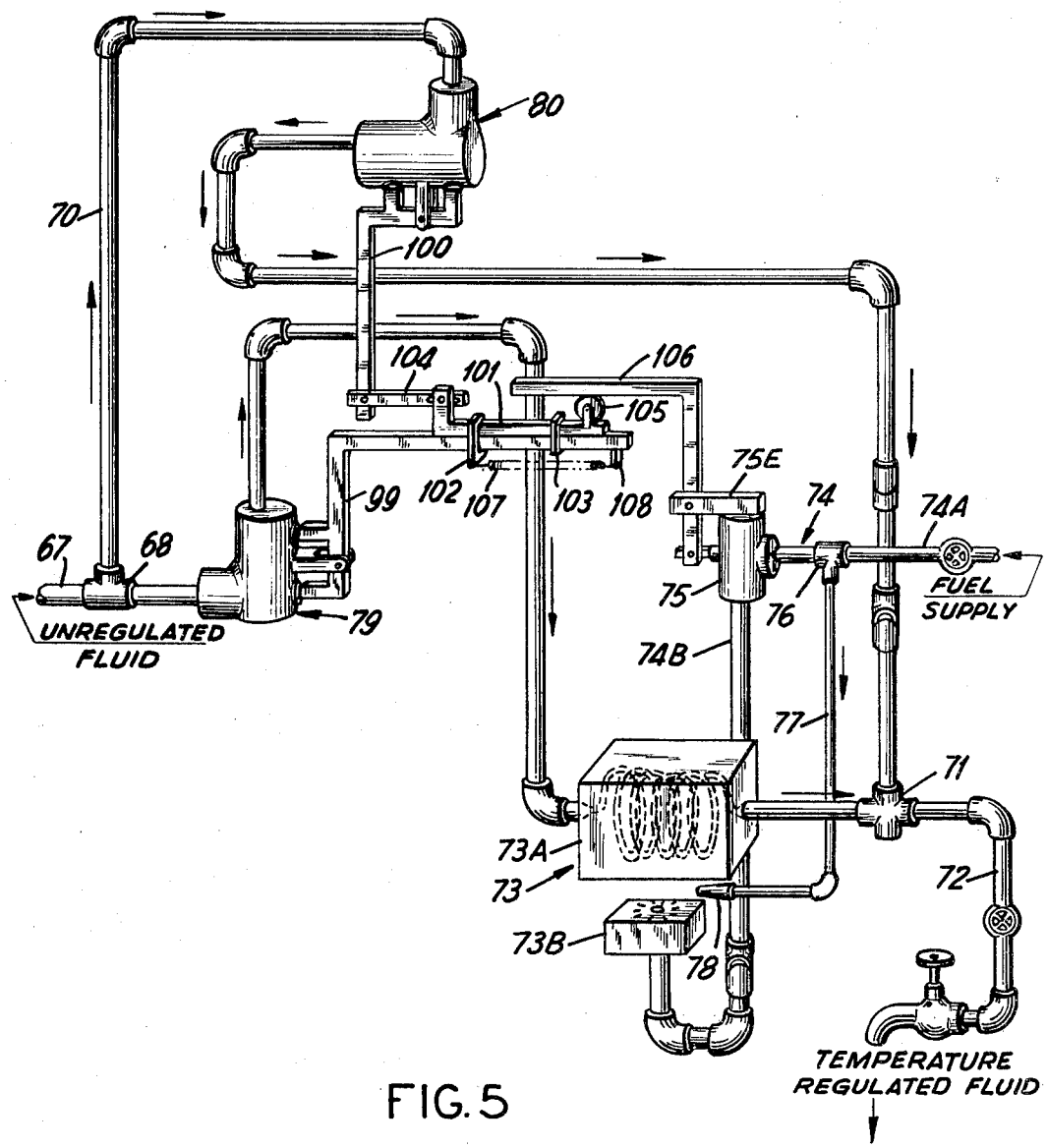
FIGURE 5 is a schematic illustration, partially diagrammatical and partially in perspective, of still another form of temperature regulating system for carrying out the present invention.

Turning now in detail to the accompanying drawings wherein like reference characters are employed to designate like parts in the several figures, there are illustrated in FIGURES 1 and 5 two alternative embodiments of system apparatus for carrying out the invention, the system apparatus illustrated in FIGURE 2 being a modified form of the apparatus of FIGURE 1 as will fully appear below. While the apparatus of FIGURES 1 and 2 are of the inferential type in that fluid flow rates are determined indirectly by sensing corresponding static pressures, the apparatus of FIGURE 5 employs means for detecting fluid flow rates directly.

Referring to FIGURE 1, unprocessed fluid from a supply source is introduced into the system illustrated therein via a main pipeline 10. Coupled in a parallel relationship one to the other to inlet main 10 by a pipe T 11 are pipeline branches 12 and 13.

Line 12 leads to a heater designated generally at 14 and will hereinafter be referred to as the process line. Line 13 by-passes the heater and will hereinafter be referred to as the quench line or by-pass line. Process line 12 and quench line 13 rejoin at a conventional thermostatic mixing valve 15. Communicating with the outlet side of the mixing valve is a pipeline 16 for transporting the mixed fluid at the desired temperature out of the system.

Heater 14, shown diagrammatically, illustratively comprises a heat exchanger 14A coupled into process line 12 and a gas burner 14B positioned below the heat exchanger.

Fuel is supplied to burner 14B via a fuel pipeline 17 which can be formed from any suitable number of connected pipe sections. Fuel line 17 includes two groups of pipe sections: a first group 17A leading from the fuel supply source to a fuel supply modulating device 18; and a second group 17B leading from fuel modulating device 18 to burner 14B.

When fuel is permitted by modulating device 18 to reach burner 14B, it is immediately ignited by a pilot light which also serves to maintain heat exchanger 14A at an intermediate temperature, reducing the time required to heat the initial liquid passing therethrough when demand for heated liquid occurs.

A pilot pipeline 19 coupled into fuel line pipe section group 17A upstream of fuel modulating device 18 by a flow splitting junction such as pipe T 20 provides a steady supply of fuel to a pilot jet or nozzle 21 to prevent the pilot light from extinguishing.

Coupled to process line 12 and quench line 13, respectively, by pipe T 22 and 23 are static pressure pipelines 24 and 25. Static pressure lines 24, 25 lead to opposite sides of fuel modulating device 18.

Modulating device 18 can be of the conventional type utilizing a diaphragm type actuator to vary the fuel line opening. The static pressure lines 24, 25 transmit, respectively, the static pressures existing in process line 12 and quench line 13 to opposite sides of the diaphragm. Modulating device 18 is adapted so that when a pressure drop occurs in process line 12 due to an increase in the rate of fluid flowing therethrough to the heater, the diaphragm actuator will tend to open fuel line 17 permitting greater amounts of fuel to reach burner 14B. Conversely, when a pressure drop occurs in the quench line 13 due to an increase in the rate of fluid flowing therethrough, the diaphragm actuator will tend to close off the fuel line decreasing the fuel supply to the burner.

Located in process line 12 at the upstream side of pipe T 22 is a conventional pressure drop compensator 26. Pressure drop compensator 26, providing a variable orifice which increases as the rate of fluid flow therethrough increases, serves to create a generally straight line relationship between fluid flow rates and corresponding static pressure drops in line 12. Quench line 13 is also provided with a similar pressure drop compensator 27 at the upstream side of pipe T 23. Hence, the static pressures transmitted by static pressure lines 24, 25 to opposite sides of the diaphragm actuator of fuel modulating device 18 will vary directly with variations in the rates of flow in lines 12 and 13. It is to be understood, however, that situations may occur where pressure drop compensators will not be required. It is envisioned, for example, that where the overall system fluid demand is constant, such devices will not be necessary. Practice of the invention may in fact determine that the advantages inherent therein are present without employing pressure drop compensators at all. Since the principles of the invention are carried out by closed loop self-modulating systems, it is believed that such systems will compensate in an entirely adequate manner for the absence of pressure drop compensators or their equivalents.

The apparatus illustrated in FIGURE 2 is of the same type as that illustrated in FIGURE 1 but is adapted for use in situations where the fluid input temperature may vary above or below the output temperature desired for the fluid. As shown therein and as fully described below, fuel modulating device 18 has been replaced by a dual modulating device 28, and cooling apparatus has been coupled into quench line 13. Device 28 performs the dual function of regulating both the fuel flow to burner 14B and the refrigerant flow in the cooling apparatus.

The cooling apparatus is of the conventional type including a refrigerant pipe line 29 comprising pipe section 29A leading from a receiver 30 to refrigerant control valve 50 (a component of dual modulating device 28), pipe section 29B leading from refrigerant control valve 50 to a heat exchanger or evaporator 31 located in quench line 13, pipe section 29C leading from exchanger 31 to a compressor 32 driven by a motor 33, pipe section 29D leading from compressor 32 to a condenser 34, and pipe section 29E leading from condenser 34 back to receiver 30. An expansion valve 35 is provided in pipe section 29B of refrigerant line 29 on the upstream side of exchanger 31.

In operation, expansion valve 35 maintains the refrigerant in pipe section 29B leading from refrigerant control valve 50 at a slightly lower pressure than the refrigerant in pipe section 29A leading to valve 50 from receiver 30 so that refrigerant flow is controlled by operation of refrigerant control valve 50.

A conventional pressurestat (not shown) is located in heat exchanger or evaporator 31 for controlling compressor motor 33 in response to the absolute pressure therein (may be vacuum in terms of p.s.i.g.).

Figure 3:
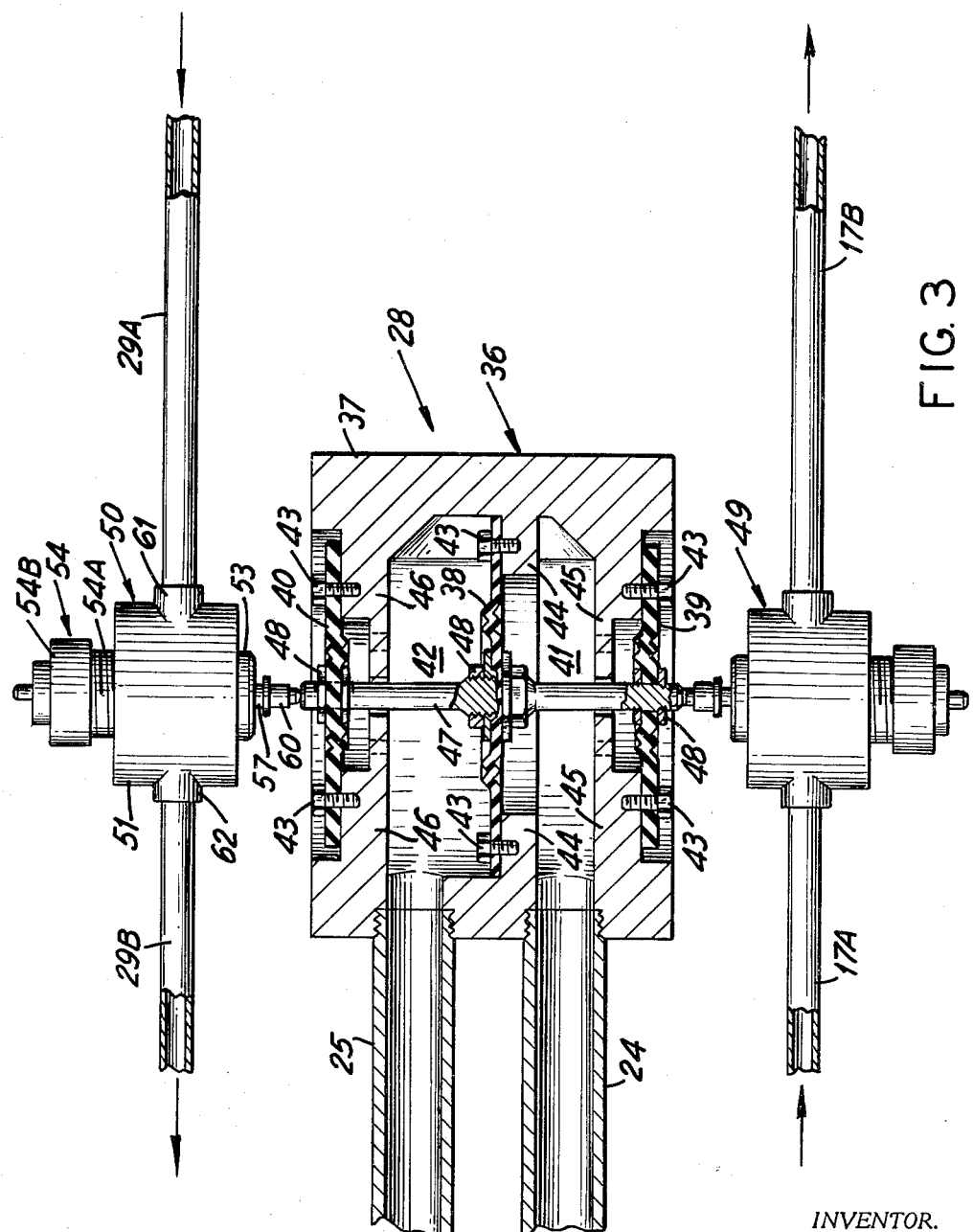
FIGURES 3 and 4 are sectional views of components of a dual modulating device for use in the system of FIGURE 2.

Referring in detail to FIGURE 3, dual modulating device 28 includes a diaphragm actuator 36, a fuel control valve 49 and a refrigerant control valve 50.

The housing 37 of diaphragm actuator 36 is generally cylindrical in configuration. The interior of housing 37 is divided by transversely extending diaphragms 38, 39 and 40 into two static pressure chambers 41 and 42. Diaphragms 39 and 40 are positioned to close off the two ends of the cylindrical housing and diaphragm 38 is positioned intermediate the two end diaphragms. Diaphragms 38, 39 and 40 can, as shown, be secured to the housing by means of screws 43 threaded into internally projecting annular ledges 44, 45 and 46, respectively.

Extending axially through cylindrical housing 37 is an actuator drive piston 47. Actuator piston 47 is threaded at the portions thereof which pass through diaphragms 38, 39 and 40 and is fixed relative to the diaphragms by lock nuts 48 so that movement of diaphragm 38 will result in axial movement of piston 47.

The static pressure in process line 12 is communicated to static pressure chamber 41 at the fuel control valve side of diaphragm 38 via static pressure line 24 connected to housing 37 in a suitable manner. Similarly, static pressure line 25 is connected to housing 37 to provide static pressure communication between quench line 13 and static pressure chamber 42 at the refrigerant control valve side of diaphragm 38. Fuel control valve 49 and refrigerant control valve 50 are substantially similar in construction.

Figure 4:
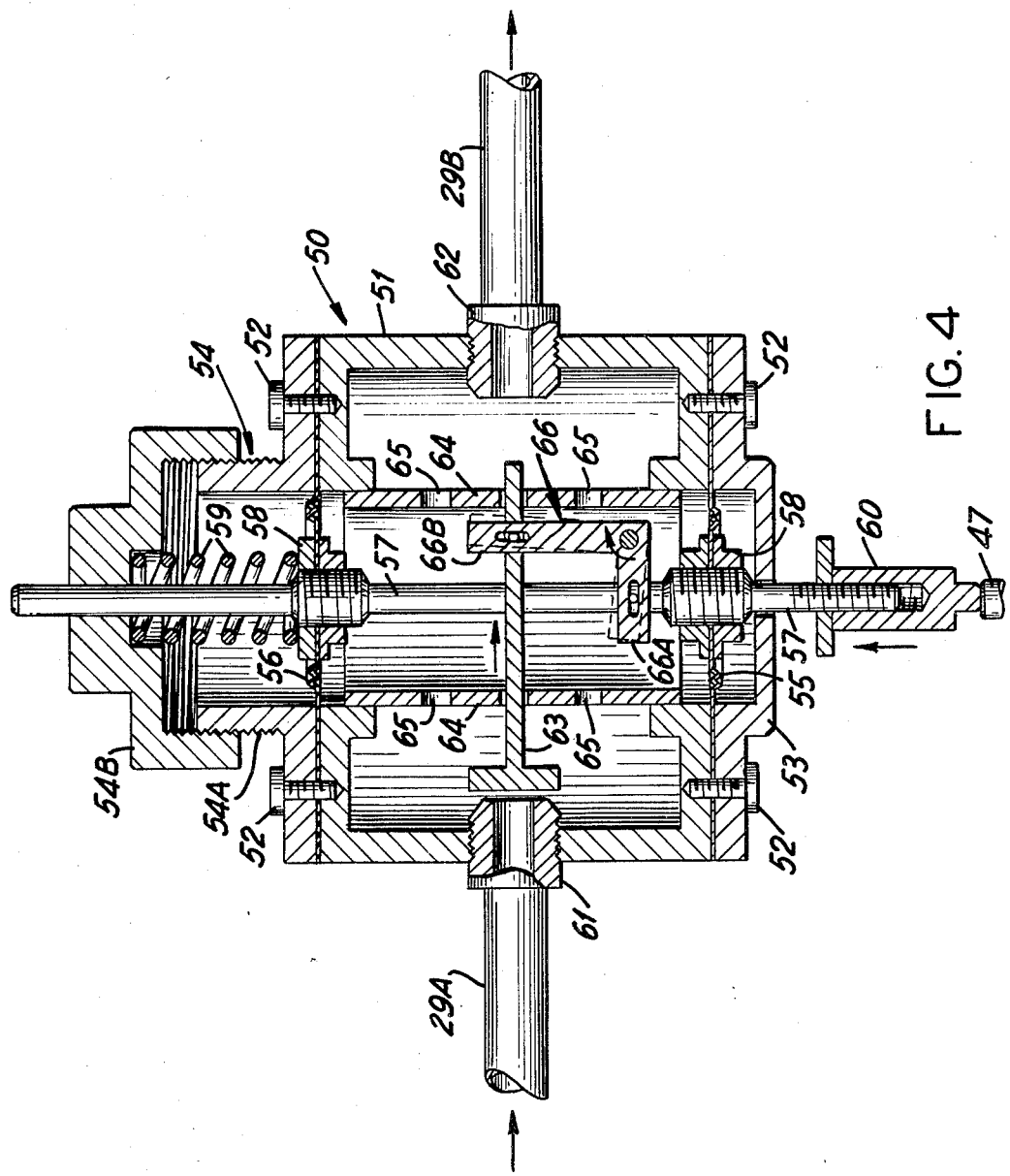

In FIGURE 4 is illustrated, for present purposes of detailed description, refrigerant control valve 50. As shown therein, valve 50 is formed with a cylindrical open-ended housing 51. Secured to the ends of the housing, as by screws 52, are guide covers 53 and 54. Cover 54 is of an adjustable two part construction being formed with an inner cover 54A and an outer cover 54B mounted upon cover 54A in screw fit engagement. Two diaphragms 55 and 56 are positioned between the housing and covers 53 and 54, respectively, to close off its open ends. A drive piston 57 similar to the drive piston of diaphragm actuator 36 extends axially through the housing and is journaled in guide covers 53 and 54. Drive piston 57 is fixedly secured to diaphragms 55 and 56 by lock nuts 58. A helical compression spring 59 is disposed about drive piston 57 at the outer side of diaphragm 56. One end of spring 59 bears upon the outer side of diaphragm 56 while its other end bears upon outer cover 54B. The force exerted upon diaphragm 56 by spring 59 may be varied by manual adjustment of cover 54.

Drive piston 57 is adapted to lightly contact the end of actuator drive piston 47 when there is no fluid flow in the system. Proper contact is assured under such conditions by the provision of a length adjustment member 60 of a lock nut construction. Member 60 is mounted onto the end of valve piston 57 in a screw fitting engagement therewith and can be adjusted to vary the effective length of piston 57 as necessary or as desired.

An inlet port member 61 and an outlet port member 62 are inserted in the cylindrical wall of the housing. The face of inlet member 61 serves as a seat for valve 63 which is journaled in a pair of guideplates 64. Preferably, the rate of flow through the inlet port should vary directly with the valve stem lift or linear displacement over the full length of stem travel—i.e., a straight line flow rate characteristic should exist.

Valve 63 is operatively connected to drive piston 57 by drive connecting member 66. Drive connecting member 66 is illustratively an L-shaped member which is pivotally secured to the housing. Arm 66A is connected to drive piston 57 while arm 66B is connected to the valve stem. As will be understood, movement of drive piston 57 against the force of compression spring 59 causes connecting member 66 to rotate in a clockwise direction moving valve 63 inwardly away from inlet port member 61. Fluid enters the housing and moves towards outlet port member 62 via transfer ports 65 formed in guide plates 64.

The drive piston of refrigerant control valve 50 contacts the actuator drive piston 47 at the side of actuator diaphragm 38 corresponding to the static pressure in quench line 13, i.e., static pressure chamber 42. The opposite side of actuator drive piston 47 contacts the drive piston of fuel control valve 49. Thus, when the flow in process line 12 is greater than the flow in quench line 13, the static pressure in the process line and in static pressure chamber 41 will be less than the static pressure in quench line 13 and static pressure chamber 42, and actuator diaphragm 38 will cause actuator drive piston 47 to move towards the fuel control valve 49 opening the valve to provide for increased heater output. When flow conditions in the system are generally reversed, and the rate of flow in quench line 13 is greater than that in process line 12, the static pressure in chamber 41 will be greater than the static pressure in chamber 42 and the actuator drive piston will move in the opposite direction towards the refrigerant control valve 50 to provide cooling system output.

Inherent in the operation of the apparatus above described is the utilization of both the static pressure in process line 12 and the static pressure in quench line 13 to control both the process output of the heater and the process output of the cooling system. Thus, while an increase in fluid flow through process line 12 results in a reduction of pressure in chamber 41 and an opening of the fuel control valve 49, a simultaneous decrease in flow through quench line 13 will result in a pressure increase in chamber 42 further opening the fuel control valve 49. Similarly, refrigerant control valve 50 will be opened not only by increases of fluid flow in quench line 13, but also by decreases of fluid flow through the process line 12.

A third embodiment of apparatus for carrying out the invention is illustrated in FIGURE 5. As contradistinguished from the apparatus of FIGURES 1–4, the present embodiment measures flow variations in the system directly, and then, through suitable mechanical computing linkages, modulates a conventional fuel supply valve in the fuel line.

More specifically, a flow system similar to that of FIGURES 1 and 2 is provided, including a main pipeline 67 leading from a fluid supply source to a flow splitting junction such as the pipe T 68 illustrated in the drawing, a process pipeline 69 and a quench pipeline 70 coupled in parallel between pipe T 68 and a conventional thermostatic mixing valve 71, and an outlet pipeline 72 leading from the outlet side of mixing valve 71.

A heater generally designated at 73 comprising a conventional heat exchanger 73A coupled into process line 69 and a gas burner 73B positioned below exchanger 73A is provided. A fuel line 74 including a pipe section group 74A leading from a fuel supply source to a fuel supply modulating valve 75 and a pipe section group 74B leading from valve 75 to burner 73B is provided for supplying fuel to the burner. Coupled to pipe section group 74A by pipe T 76 is a pilot fuel supply pipeline 77 providing a steady supply of fuel to a burner pilot nozzle or jet 78.

Valve 75 is controlled by a series of mechanical linkages which in turn are actuated by flow sensing devices 79 and 80 located in process line 69 and quench line 70, respectively. The flow sensing devices are similar and are preferably of the type illustrated in FIGURES 6 and 7 of the drawing.

As shown therein, each of the flow sensing devices has a housing 81 in the nature of a pipe elbow fitting adapted for coupling into each of pipe lines 69 and 70. Housing 81 includes integrally formed cylindrical portions 81A and 81B defining, respectively, an inlet passageway 82 and an outlet passageway 83 extending orthogonally therefrom. Flow is conducted from inlet passageway 82 to outlet passageway 83 via connecting passageway 84.

Outlet passageway 83 communicates with a static pressure passageway 85 which extends away therefrom in a direction orthogonal to the direction of flow therein. Static pressure passageway 85 leads to a static pressure port 86 formed in the cylindrical wall portion 81B of the housing diametrically opposite from cylindrical inlet portion 81A and displaced axially therefrom. Static pressure port 86 is provided with a flexible leak-proof diaphragm cover 87 which is secured to the outer surface of the housing wall.

Cylindrical section 81B is also formed with a dynamic pressure port 88 which is spaced apart from static pressure port 86 and is coaxially aligned with inlet passageway 82. Positioned directly above dynamic pressure port 88 is a dynamic pressure chamber 89. Dynamic pressure chamber 89 has a static pressure extension 90 which communicates with outlet passageway 83 adjacent connecting passageway 84 and which extends in a direction generally orthogonal to the flow therein. Similarly to static pressure port 86, dynamic pressure port 88 has a flexible leak-proof diaphragm cover 91 which is secured to the exterior surface of the housing.

As mentioned above, flow sensing devices 79 and 80 are adapted for coupling into their respective liquid pipelines. A pipe coupling member 92 secured to the inlet portion 81A of the housing by lock nut 93 is employed for connecting inlet passageway 82 to the pipeline. The outlet passageway 83 is adapted for connection to the pipeline by the provision of a screw thread at its terminal portion.

Flow sensing devices 79 and 80 are provided, respectively, with balance arms 99 and 100. These balance arms comprise the initiating levers of the mechanical linkage system employed for regulation of the fuel modulating valve 75 as will more fully appear below. Each of balance arms 99 and 100 is pivotally secured to its flow sensing device by means of a pintle 94 which is, in turn, supported at its ends by a pair of pintle supports 95 depending from the housing intermediate static pressure port 86 and dynamic pressure port 88.

Balance arms 99 and 100 are provided with pairs of feeler extensions or buttons 99A, 99B and 100A, 100B, respectively. These buttons are positioned on the balance arms so as to lightly contact the static pressure port diaphragm 87 and the dynamic pressure port diaphragm 91 of the flow sensing device under conditions of no flow.

A valve actuator 96 is suitably disposed within the housing for imparting rotational movement to the balance arm in response to increases in fluid flow rate through the sensing device. The valve actuator includes a stem 96A, a head 96B secured to one end of the stem and an actuator 96C secured to its other end. Stem 96A is journaled in guide 97 for axial movement; head 96B is positioned within inlet passageway 82 transversely of the incoming flow; and actuator 96C is positioned within dynamic pressure chamber 89 for applying flexing pressure to diaphragm cover 91.

A compression spring 98 is disposed about valve actuator stem 96A within inlet passageway 82 and serves to urge the valve actuator towards the incoming flow and away from diaphragm cover 91. The lower end of the compression spring as viewed from FIGURE 7 rests within an annular recess 97A formed in the upper surface of guide 97. The bottom surface of pipe coupling member 92 is formed with an annular recess 92A co-extensive in diameter with inlet passageway 82. Annular recess 92A serves as a seat for valve actuator head 96B.

Under conditions of no flow, actuator 96C barely contacts diaphragm 91 without causing it to flex outwardly. The static pressure within static pressure passageway 85 is equal to the static pressure within dynamic pressure chamber 89 and the balance arm remains in its initial unrotated position. Upon the occurrence of fluid flow or when the rate of flow increases, actuator 96 is forced to move towards diaphragm 91 causing it to flex outwardly and impart rotational movement to the balance arm. The static pressures existing within chamber 89 and passageway 85 should remain substantially equal as flow increases so that the amount of rotation imparted to the balance arm will depend solely upon the rate of incoming flow.

Figure 8:
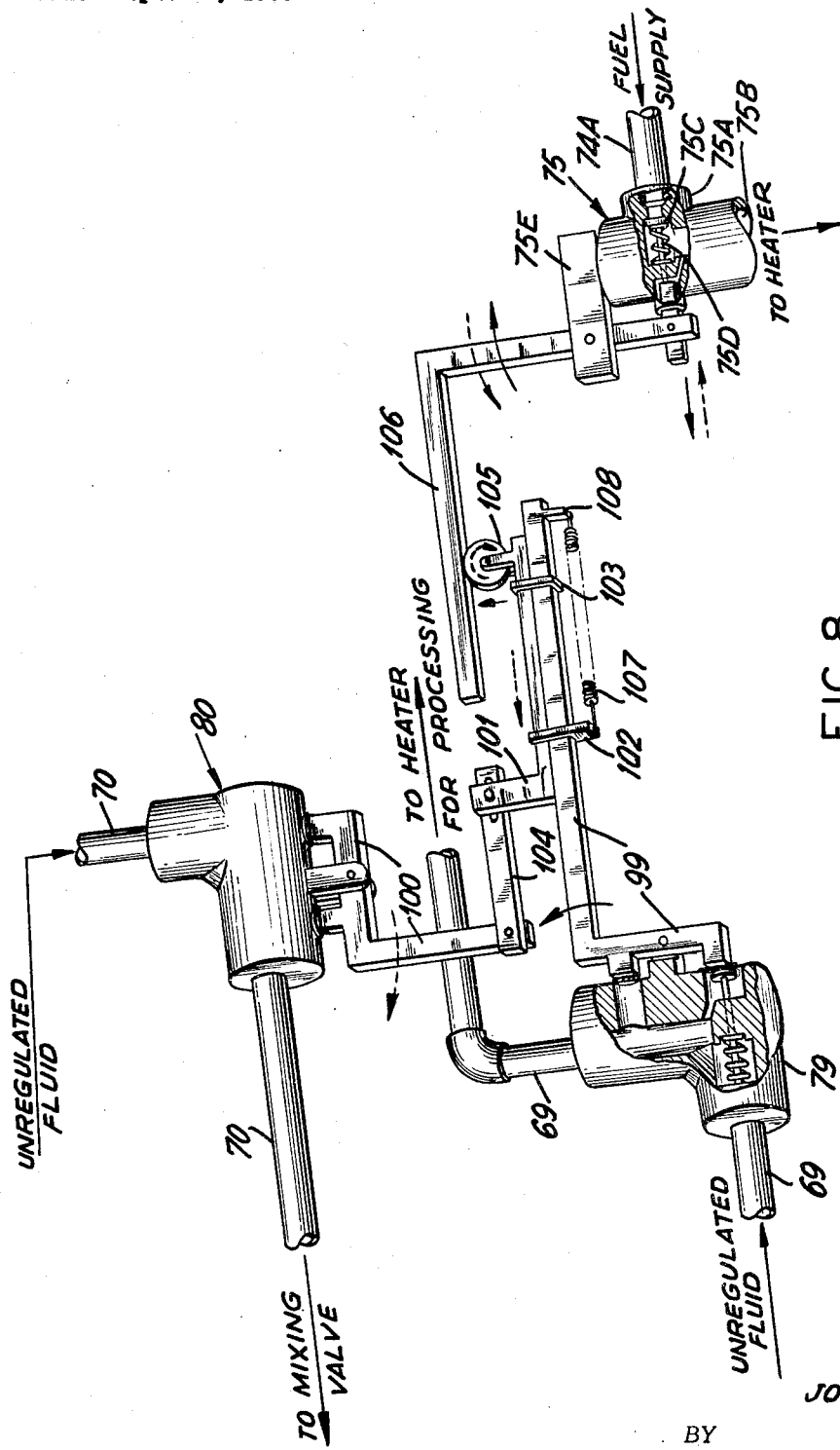
FIGURE 8 is a perspective view, partially in section, of fuel modulating apparatus employed in the system of FIGURE 5.

Illustrated in FIGURE 8 is the fuel modulating apparatus of the fluid temperature regulating system of FIGURE 5. As shown therein, balance arms 99 and 100 are L-shaped in configuration. Flow sensing devices 79 and 80 are disposed so that balance arm 99 extends towards fuel control valve 75 and balance arm 100 extends towards flow sensing device 79.

In addition to balance arms 99 and 100, the mechanical linkage arrangement includes an L-shaped member 101 which is slidably mounted on balance arm 99 by means of a pair of guide members 102 and 103. Guide members 102 and 103 are fixedly secured to sliding member 101 and are free to move along balance arm 99. Sliding member 101 is pivotally linked to balance arm 100 by a connecting pivot arm 104 so that rotation of balance arm 100 will cause member 101 to slide along balance arm 99. Preferably, pivot arm 104 is connected to member 101 by an adjustable pivot pin and slot arrangement.

Secured to the terminal portion of sliding member 101 is a wheel 105 serving to support an L-shaped fuel control lever arm 106 which is operatively connected to fuel control valve 75. Thus, the position of sliding member 101 on balance arm 99 determines the effective radius of rotation of balance arm 99. Sliding member 101 is constantly being urged towards fuel control valve 75 by a tension spring 107 which is connected at its ends to guide member 102 and to a spring support 108 extending from the end of balance arm 99.

Member 101 can initially be selectively positioned along balance arm 99 by simple pre-adjustment of the pin and slot arrangement. Adjustment of sliding member 101 is, in effect, an adjustment of the effective radii of rotation of balance arm 99 and fuel control lever arm 106 to achieve proper initial balancing of the process output with respect to fluid flow rates. Simultaneously, this balancing adjustment sets the "zero" damp position of sliding member 101 and also provides take-up means for compensating for errors in positioning the various components during installation.

Referring to FIGURES 5 and 8, fuel control valve 75 is provided with a generally cylindrical housing. Communication with the fuel supply source is via pipe section group 74A of fuel line 74 which is operatively connected to valve inlet 75A formed in the cylindrical wall of the housing. Pipe section group 74B of the fuel line leads to the burner from the valve outlet 75B formed in one end of the housing. Positioned for regulating the fuel flow through inlet 75A is valve head 75C and stem 75D extending through the diametrically opposite side of the cylindrical housing wall. Stem 75D, which is journaled in the housing wall for axial movement towards or away from valve inlet 75A, is pivotally secured to fuel control lever arm 106 which is similarly pivotally secured to a supporting arm 75E fixedly secured to the closed end of the housing.

During operation, an increase of flow through the process line and hence through flow sensing device 79 located therein results in a counterclockwise rotation of its associated balance arm 99. This counterclockwise movement serves to lift sliding member 101 and its support wheel 105 resulting in a clockwise rotation of fuel control lever arm 106. Lever arm 106 pivots on supporting arm 75E of fuel control valve 75 causing valve stem 75D and is associated valve head 75C to move away from valve inlet 75A permitting greater fuel flow to the burner and hence greater thermal output rate.

Independently of and simultaneously with this operation, any increase of fluid flow through the quench line and its associated flow sensing device 80 reprsenting the thermal process output rate in excess of the rate required to heat the quantity of fluid passing through the heater to obtain the desired output temperature results in a clockwise rotation of balance arm 100. This movement causes member 101 to slide along balance arm 99 against the force exerted by spring 107 towards the axis rotation of balance arm 99 and away from the axis of rotation of fuel control lever arm 106 which rests thereon thereby decreasing the radius of rotation of the former and increasing the radius of rotation of the latter resulting in a damping effect on the action of balance arm 99 as above described. In operation, this movement of sliding member 101 results in a counterclockwise rotation of fuel control lever arm 106 and a movement of valve stem 75D and head 75C towards valve inlet 75A decreasing the fuel flow to the burner.

While the flow sensing devices and their respective balance arms act independently of one another as above described, it will be appreciated that the arrangement of linkages shown and described has the effect of integrating their relative movements prior to modulation of fuel control valve 75 so that the fuel flow rate to the burner and the resultant thermal process output rate is a function of a single characteristic determined by the fluid flow rates of both the process line and the quench line.

It should be obvious from the foregoing that valuable process and control system performance data can be obtained by attaching in operative manner, recording instruments at strategic locations on balance arms 99 and 100 and on fuel control lever arm 106. In fact, mechanical computing linkages such as the type illustrated herein may easily be adapted for use simply as a recorder to collect performance data for records, and for dynamic analyses and evaluation of processes of other process control systems.

In accordance with the invention, the various embodiments illustrated herein operate in the following manner to provide effective fluid temperature regulation and control. It is assumed that the flow capacity, heating capacity and cooling capacity of the various systems embodying the invention are sufficient to provide the necessary temperature regulation and control under the maximum demands encountered in any particular application. In this respect, the required sizes of the various pipelines may be determined upon an initial analysis of the system requirements and from similar analyses, the specifications for the heat exchangers, temperature regulating media, valves, modulating apparatus and the like can be initially determined to satisfy particular requirements.

In situations where the input temperature of the fluid to be controlled will always be equal to or less than its desired output temperature, system embodiments such as the ones illustrated in FIGURES 1 and 5 can be employed. The thermostatic mixing valve is initially set to provide fluid at the temperature desired. Thereafter, if the desired output temperature should change, the mixing valve must be re-set to deliver fluid at the new temperature. Assuming initially, a condition of no demand, there will be no fluid flowing through the system; the fuel modulating apparatus will remain in equilibrium and the process output of the heating apparatus will be zero. While fuel flow to the burner will be non-existent under these conditions, there will be a steady flow of fuel through the pilot fuel line to prevent the pilot light from extinguishing thereby maintaining the heat exchanger at an intermediate temperature as has been explained above. When the fluid input temperature is below the temperature desired, all of the flow through the system upon initial demand will take place through the process line and heater as the mixing valve is adapted to permit flow through the quench line only when the temperature of the fluid in the process line is equal to or exceeds the temperature setting. The flow sensing device located in the process line responds to the presence of or increase in flow therethrough to provide positive actuation of the fuel modulating apparatus resulting in corresponding increases of fuel flow to the burner. The pilot light ignites the fuel exiting the burner and the fluid flowing through the heat exchanger receives a temperature increase. If and when the temperature of the fluid entering the mixing valve from the process line surpasses the valve temperature setting, the valve automatically opens the quench line, mixes the fluids from the two lines and delivers the mixed fluid at the desired temperature to the output of the system.

Where the over-all system flow remains constant, increases in flow through the quench line are accompanied by corresponding decreases of flow through the process line and vice versa. The amount of fluid permitted to flow through the quench line and the corresponding decrease in fluid flow through the process line depends directly upon the relationship between the temperature of the fluid entering from the process line and the mixing valve temperature setting. As fluid flow increases in the quench line, the flow sensing device located therein functions to provide negative actuation of the fuel modulating apparatus, thereby cutting down on the thermal output of the heater. This action is accompanied simultaneously by a similar cutdown in the thermal output resulting from a decrease of flow through the sensing apparatus in the process line; thus, immediate and accurate process output modulation is achieved.

It can be readily seen that the thermal output of the heater in accordance with the present invention does not depend solely on the rate of fluid flow through the heater, as is the case in the prior art systems. The amount of fluid flow through the quench line plays an equally important role in providing thermal process output modulation. Flexibility in the thermal output and hence in the temperature rise provided by the heater to the fluid flowing therethrough is obtained with the result that, if and when the differential existing between the fluid input temperature and the desired output temperature should vary, so too will the temperature rise imparted to the input fluid by the heater.

One advantage derived by application of the methods and apparatus of this invention results from the direct measurement of excess process output by reference to the flow through the quench or by-pass line, since this flow rate is directly proportional to the excess process output rate. The practical effect resulting from the damping control derived therefrom is that the process rate is attenuated so that less process output is effectively applied to the same percentage or portion of the overall fluid flow, and less temperature change is imparted to each unit of flow passing through the process line. By this means, process line output fluid temperature differential from mixing valve set point is reduced to a minimum.

An advantage of the present invention in addition to the damping effect on the excess thermal process output rate can best be explained in terms of an application where the overall system fluid flow rate is constant. In such a situation, any sudden increase of fluid flow through the process line representing an increase in demand for thermal process output rate will be accompanied by a corresponding decrease in fluid flow through the quench line. This increase in flow through the process line results, as will be understood from all of the foregoing, in a proportional increase in the thermal process output rate. However, the decrease in flow through the quench line simultaneously causes an additional proportional increase in thermal output process rate to occur. This secondary control effect provided by the quench line serves to cut substantially the time normally required for heater response. Such heater response is also obtained where temperature requirements are reversed and there exists a sudden decrease in demand for thermal process output rate.

While the operation of the invention has been explained with respect to the embodiments illustrated in FIGURES 1 and 5 of the drawing, it will be understood that cooling apparatus may be inserted in the process line to replace the heating apparatus shown therein with the same principles of operation and temperature control effect. This, of course, would be necessary where the input temperature of the fluid will always be greater than or equal to its desired output temperature.

In circumstances where the input temperature of the fluid may be greater than or less than its desired output temperature, the embodiment illustrated in FIGURE 2 can be employed. The heater thermal output rate of this system is modulated in the same manner as has been described above. The cooling apparatus located in the quench line is controlled in a manner converse to that of the heating apparatus. More specifically, when cooling is required, and more than 50% of total flow is passing through the quench line by operation of thermostatic mix valve, increases in fluid flow through the quench line result in increases in refrigerant flow through the cooling apparatus, and hence greater temperature drops in the fluid flowing therethrough. Similarly, decreases in fluid flow through the process line result in increases in refrigerant flow. Therefore, variations in flow through each of the fluid pipelines can result in a control action for modulation of either the heating or cooling process. The system will, as in the case of any system embodying the present invention, reach a point where the thermal output of either the heating or cooling apparatus is at an optimum with regard to the existing temperature conditions and requirements and with regard to over-all demand for temperature-regulated fluid.

In the study and practice of the invention, variations and modifications will undoubtedly occur, and it is understood that any changes in the details, methods, steps, combinations and arrangements of elements which have herein been described and illustrated in order to explain the nature of the invention may be made by those skilled in the art without departing from the principles and scope of the invention as expressed in the appended claims and without sacrificing its chief advantages.

For example, in situations requiring extremely close temperature control, it may be desirable to employ two or more temperature-regulating systems in accordance with the invention in a series arrangement.

For a further example, while the principles of the invention have been explained by reference to systems employing gas heaters for raising the temperature of the fluid, other heating means may be employed for this purpose such as an electrical subsystem or a steam heating subsystem. Similarly, while reference has been made to a refrigerant cooling system, other cooling systems are equally feasible such as a chilled brine circulating system.

What is claimed is:

1. A method for providing fluid at a constant predetermined temperature in accordance with fluid demand, the steps of which comprise
   (a) transporting said fluid in accordance with demand from an input point to an output point via two parallel paths, mixing the fluids from said paths prior to said output point (b) thermally processing the fluid flowing along one of said paths when a temperature differential exists between the input temperature of the fluid and said predetermined temperature, varying the thermal process output per unit of fluid being processed directly with variations in said temperature differential and (c) apportioning the total fluid flow between said paths to obtain fluid at said constant predetermined temperature.

2. A method for providing fluid at a constant predetermined temperature in accordance with fluid demand, the steps of which comprise (a) transporting said fluid in accordance with demand from an input point to an output point via two parallel paths, mixing the fluids from said paths prior to said output point (b) thermally processing the fluid flowing along one of said paths, modulating the thermal process output as a function of demand for unprocessed fluid and (c) apportioning the total fluid flow between said paths to obtain fluid at said constant predetermined temperature.

3. A method in accordance with claim 2, wherein the thermal process output per unit of fluid being processed is varied inversely with the ratio of demand for unprocessed fluid to total fluid demand.

4. A method in accordance with claim 3, wherein the thermal process output is zero when total fluid demand is twice the demand for unprocessed fluid.

5. A method for providing fluid at a constant predetermined temperature in accordance with fluid demand, the steps of which comprise (a) transporting said fluid in accordance with demand from an input point to an output point via two parallel paths, mixing the fluids from said paths prior to said output point (b) thermally processing the fluid flowing along one of said paths, modulating the thermal process output as a function of both demand for processed fluid and demand for unprocessed fluid and (c) apportioning the total fluid flow between said paths to obtain fluid at said constant predetermined temperature.

6. A method in accordance with claim 5, wherein the thermal process output rate is varied as a direct function of demand for processed fluid.

7. A method in accordance with claim 6, wherein the thermal process output rate is varied as an inverse function of demand for unprocessed fluid.

8. A method in accordance with claim 5, wherein the thermal process output rate is directly proportional to the amount that demand for processed fluid exceeds that for unprocessed fluid.

9. A method in accordance with claim 5, wherein the thermal process output rate is zero when demand for processed fluid equals demand for unprocessed fluid.

10. A method in accordance with claim 9, wherein the thermal process output per unit of fluid being processed is a maximum only when demand for unprocessed fluid is zero.

11. A method in accordance with claim 7, wherein the demands for processed fluid and unprocessed fluid are determined by sensing the fluid flow rates in their respective paths.

12. A method in accordance with claim 11, wherein the thermal process comprises heating the fluid flowing along one of said paths.

13. A method in accordance with claim 12, wherein the rate of fluid flow along each of said paths is sensed by means of the corresponding static pressures in said paths.

14. A method in accordance with claim 12, wherein the rate of fluid flow along each of said paths is sensed by means of the dynamic pressure head in the flow path.

15. A method in accordance with claim 11, wherein the thermal process comprises heating the fluid flowing along one of said paths and cooling the fluid flowing along the other of said paths.

16. A method in accordance with claim 15, wherein the rate of fluid flow along each of said paths is sensed by means of the corresponding static pressures in said paths.

17. A method in accordance with claim 11, wherein the thermal process comprises cooling the fluid flowing along one of said paths.

18. A method in accordance with claim 17, wherein the rate of fluid flow along each of said paths is sensed by means of the corresponding static pressures in said paths.

19. A method for providing fluid at a constant predetermined temperature in accordance with fluid demand, the steps of which comprise (a) transporting said fluid in accordance with demand from an input point to an output point via two parallel paths, mixing the fluids from said paths prior to said output point (b) thermally processing the fluid flowing along one of said paths when the static pressure of the fluid in said path is less than the static pressure of the fluid in the other path, varying the thermal process output so that it is directly proportional to the difference between said static pressures, and (c) apportioning the total fluid flow between said paths to obtain fluid at said constant predetermined temperature.

20. A system for producing in accordance with demand fluid at a constant predetermined temperature, comprising (a) a fluid flow system including inlet means for introducing said fluid to said system, first and second separate fluid conduits connected to said inlet means, and thermostatic mixing means connected to said fluid conduits for apportioning the total fluid flow in said system determined by instantaneous fluid demand between said two conduits and mixing the the fluids flowing thereform to obtain said constant predetermined temperature for said fluid (b) thermal process means operatively disposed with respect to said fluid conduits for causing the temperature of the fluid flowing through one of said conduits to approach said predetermined temperature (c) flow sensing means operatively coupled to said fluid conduits for determining the instantaneous demand for processed fluid and for unprocessed fluid, and (d) modulation means operatively coupled to said flow sensing means and to said thermal process means for controlloing the output of said thermal process means as a function of the relative instantaneous demands for processed and unprocessed fluid.

21. A system as defined in claim 20, wherein said modulation means varies said thermal process output directly with demand for processed fluid.

22. A system as defined in claim 21, wherein said modulation means simultaneously varies said thermal process output inversely with demand for unprocessed fluid.

23. A system as defined in claim 20, wherein said modulation means controls the output of said thermal process means in accordance with the difference between demand for processed fluid and demand for unprocessed fluid.

24. A system as defined in claim 20, wherein said modulation means includes actuator means responsive directly to fluid pressure and wherein said flow sensing means includes pressure transmission means connecting said first and second fluid conduits to said modulation means for establishing fluid pressure communication therebetween.

25. A system as defined in claim 20, wherein said flow sensing means includes a pair of devices in the two fluid flow conduits said devices being operative to monitor the dynamic pressures in the said fluid conduits.

26. A system as defined in claim 23, wherein said thermal process output is zero when demand for processed fluid equals demand for unprocessed fluid.

27. A system as defined in claim 26, wherein said thermal process means comprises means for heating the fluid flowing along said first fluid conduit.

28. A system as defined in claim 27, wherein said thermal process means comprises means for cooling the fluid flowing along said second fluid conduit.

29. A system as defined in claim 26, wherein said thermal process means includes means for cooling the fluid flowing along one of said fluid conduits.

30. A system as defined in claim 25, wherein said modulation means includes a plurality of mechanical linkages operatively interconnecting said dynamic pressure monitoring devices to compute the difference between the dynamic pressures in the said conduits and to vary said thermal process output in a directly proportional relationship with said difference.

31. A system as defined in claim 30, wherein said thermal process means comprises a thermal processing medium and said modulation means includes valving means for regulating the flow of said medium, said mechanical linkages being operatively connected to control the function of said valving means.

32. A system as defined in claim 25, wherein said dynamic pressure monitoring devices are substantiallfiy similar in construction, each including
  (a) an elbow-shaped housing defining
    an inlet passageway having a restricted inlet area
    an outlet passageway extending orthogonally away from said inlet passageway and
    a pair of spaced apart pressure ports in static pressure communication with the fluid flowing through said device formed in the outer wall thereof
  (b) a diaphragm cover sealing off each of said ports
  (c) a normally balanced lever arm pivotally secured to said housing externally thereof intermediate said pressure ports
    said lever arm having feeler means operatively disposed in opposite sides of its pivot center for normally lightly contacting said diaphragm covers under no flow conditions
  (d) a valve actuator having a head portion positioned in said inlet passageway for closing off said restricted inlet area under no flow conditions
    a stem portion journaled in said housing for axial movement relative thereto within said inlet passageway
    an actuator portion secured to the end of said stem portion opposite from said head portion, said actuator portion normally lightly contacting one of said diaphragm covers under no flow conditions and
    a spring member urging restricted actuator axially towards said restricted inlet area and away from said diaphragm cover
    said elements being arranged so that said valve actuator moves axially within said inlet passageway in response to variations in the dynamic pressure of the fluid flow therethrough causing the said actuator portion thereof to commensurately change the flexure of the port diaphragm cover it normally contacts to thereby control the rotational movement of said normally balanced lever arm.

33. A system for producing in accordance with demand fluid at a constant predetermined temperature, comprising
  (a) a fluid flow system including inlet means for introducing said fluid to said system, first and second separate fluid conduits connected to said inlet means, and thermostatic mixing means connected to said fluid conduits for apportioning the total fluid flow in said system determined by instantaneous fluid demand between said two conduits and mixing the fluids flowing therefrom to obtain said constant predetermined temperature for said fluid
  (b) heating means including a heating medium conduit operatively disposed with respect to said first fluid conduit for raising the temperature of the fluid flowing therethrough
  (c) cooling means including a cooling medium conduit operatively disposed with respect to said second fluid conduit for lowering the temperature of the fluid flowing therethrough
  (d) first control valve means operatively coupled to said heating medium conduit for controlling the flow of heating medium therethrough
  (e) second control valve means operatively coupled into said cooling medium conduit for controlling the flow of cooling medium therethrough
  (f) fluid pressure responsive actuator means connected to said first and second control valve means for simultaneously regulating the operation of said valve means in accordance with the static pressures in said conduits, and
  (g) a pair of static pressure conduits connecting said fluid conduits directly to said actuator means establishing static pressure communication therebetween whereby the outputs of said heating means and said cooling means are simultaneously modulated in accordance with the instantaneous demands for heated and cooled fluid.

34. A system as defined in claim 33, wherein said actuator means includes a housing, a diaphragm fixedly secured to said housing, and said housing defining a pair of static pressure chambers at opposite sides of said diaphragm, and an actuator drive piston fixedly secured to said diaphragm for axial movement responsive to flexure of said diaphragm, said static pressure conduits each being connected to a different one of said static pressure chambers so that differences between the flow rates in said fluid lines result in axial movement of said piston relative to said housing.

35. A system as defined in claim 33, wherein said flow control valves impart straight line flow characteristics to said heating and cooling media.

36. A system as defined in claim 33, wherein said flow control valves are substantially similar in construction, each including a cylindrical housing defining an enclosed chamber having an inlet port and an outlet port, a valve head and stem positioned to vary the opening of said inlet port, a piston member journaled in said housing for axial movement relative thereto, a connecting member pivotally secured to said housing and operatively secured to said piston and said valve stem so the movement of said piston causes said valve head to move relative to said inlet port varying the opening thereof and spring means operatively connected to said piston for urging said piston to move in a direction causing said valve head to close said inlet port.

37. A system as defined in claim 33, wherein said first and second control valve means and said actuator means are interconnected and adjusted so that said heating medium conduit and said cooling medium conduit are never open at the same time and are both closed when the static pressures in said fluid conduits are equal.

38. A system as defined in claim 33, wherein said first and second control valve means and said actuator means are interconnected to produce equal and opposite responses in said valve means.

References Cited
UNITED STATES PATENTS 2,609,183   9/1952   Fitzgerald   165—22
2,793,812   5/1957   McDonald   165—22

ROBERT A. O'LEARY, Primary Examiner

CHARLES SUKALO, Assistant Examiner

U.S. Cl. X.R.

137—3; 165—26, 32,

PO-1050
(5/69)

UNITED STATES PATENT OFFICE
CERTIFICATE OF CORRECTION

Patent No. 3,496,991      Dated February 24, 1970

Inventor(s)      John W. Barnd

It is certified that error appears in the above-identified patent and that said Letters Patent are hereby corrected as shown below:

In the Specification

In column 1, line 72, after "with" delete "the".

In column 2, line 44, delete "in"; line 56, "regulaiting" should read - - regulating - - .

In column 6, line 66, "5'7" should read - - 57 - - ; line 71, "in a screw fitting" should read - - in screw fitting - - .

In column 10, line 16, "reprsenting" should read - - representing - - line 22, "axis rotation" should read - - axis of rotation - - .

In the Claims

In column 15, line 5, "conduits said" should read - - conduits, said - -; line 63, "urging restricted actuator" should read - - urging said valve actuator - -.

In column 16, line 29, insert - - fluid - - after "said" and before "conduits"; line 40, "to said housing, and said housing" should read - - to said housing, said housing - -; line 61, "so the movement" should read - - so that movement - - .

SIGNED AND
SEALED
AUG 11 1970

(SEAL)
Attest:

Edward M. Fletcher, Jr.
Attesting Officer

WILLIAM E. SCHUYLER, JR.
Commissioner of Patents